United States Patent [19]
Blair

[11] Patent Number: 6,101,111
[45] Date of Patent: Aug. 8, 2000

[54] OUTPUT POWER CONTROL CIRCUIT FOR A FLYBACK CONVERTER

[75] Inventor: Barry O. Blair, Garland, Tex.

[73] Assignee: Lucent Technologies, Inc., Murray Hill, N.J.

[21] Appl. No.: 09/408,718

[22] Filed: Sep. 29, 1999

[51] Int. Cl.$^7$ .................................................. H02M 3/335
[52] U.S. Cl. ............................................. 363/97; 363/21
[58] Field of Search .................... 363/20, 21, 97

[56] References Cited

U.S. PATENT DOCUMENTS

| | | | |
|---|---|---|---|
| 4,504,898 | 3/1985 | Pilukaitis et al. | 363/21 |
| 5,303,138 | 4/1994 | Rozman | 363/21 |
| 5,453,921 | 9/1995 | Shutts | 363/21 |
| 5,541,828 | 7/1996 | Rozman | 363/21 |
| 5,903,452 | 5/1999 | Yang | 363/97 |
| 6,011,706 | 1/2000 | Adragne et al. | 363/97 |

*Primary Examiner*—Jeffrey Sterrett
*Attorney, Agent, or Firm*—Locke Liddell & Sapp LLP

[57] ABSTRACT

In a flyback converter receiving a high voltage DC input for generating a low voltage output, a power control circuit includes a peak current mode controller having as an input, the flyback converter output. The controller generates a feedback signal to the flyback converter for controlling the switching frequency of switches present in the flyback converter. The peak current controller includes a clock circuit. Circuitry monitors the high voltage DC input. The monitoring circuit generates a control signal which is applied to the controller clock circuit for controlling the switching frequency of the flyback converter to thereby control output power levels.

3 Claims, 1 Drawing Sheet

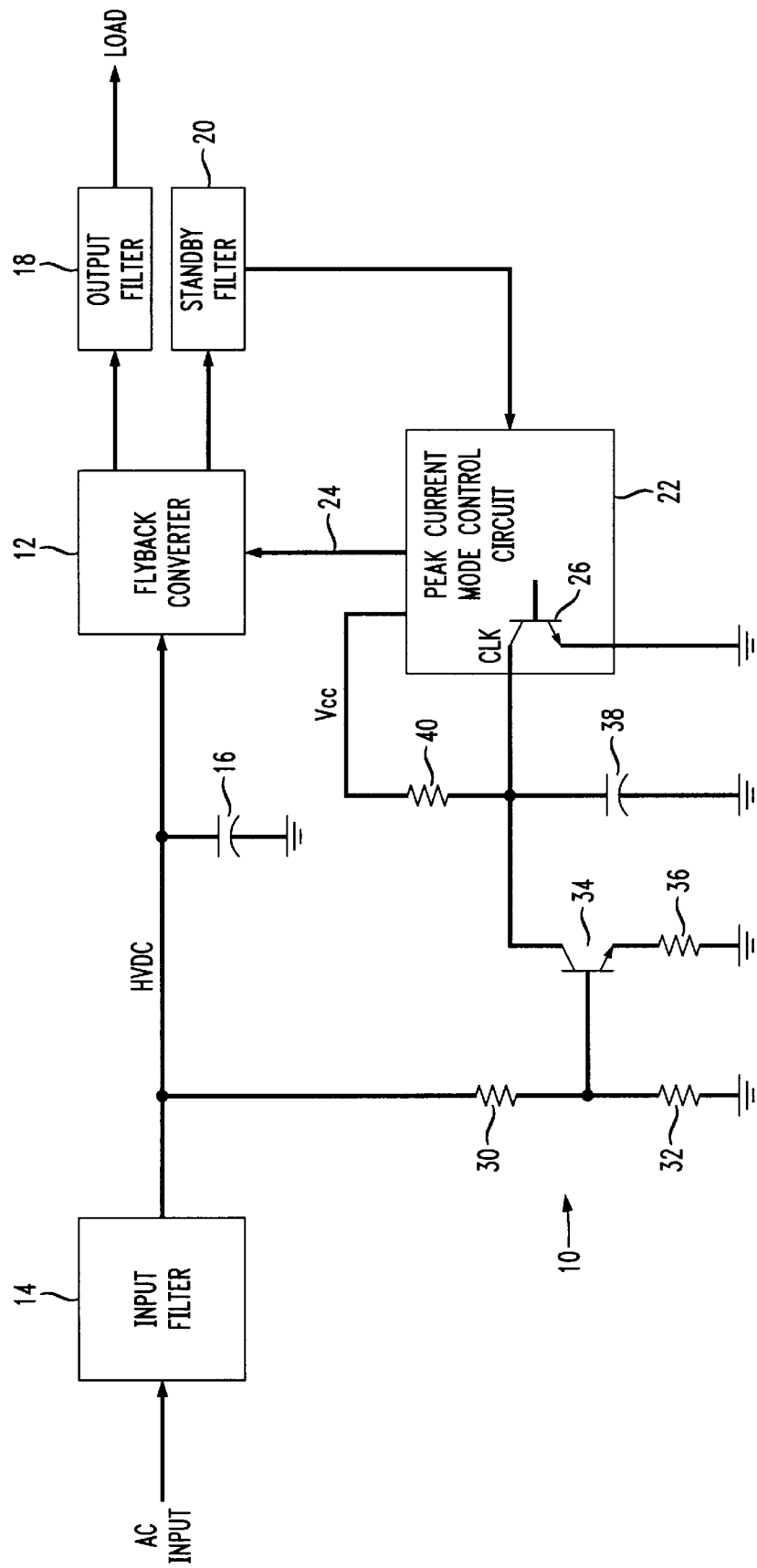

OUTPUT POWER CONTROL CIRCUIT FOR A FLYBACK CONVERTER

TECHNICAL FIELD OF THE INVENTION

The present invention relates to switching type power converters, and more particularly to a limiting output power control circuit for a flyback converter.

BACKGROUND OF THE INVENTION

Power converters such as, for example, converters embodying flyback topologies, are subject to safety considerations requiring limits on the maximum output power over a wide range of inputs. Although such converters utilize a current mode controller to limit the peak current of the primary switch of the flyback converter transformer, the output power can still vary to undesirable levels over large input line variations. Previous approaches to control output power have included operating the converter in a discontinuous mode, or the use of a latch-off or hiccup mode of operation when excessive output power is detected. The discontinuous mode technique requires significantly higher primary peak currents to provide full output power. The latch-off or hiccup mode requires extra power/current sensing and control circuits, increasing the complexity and cost of such power control circuits.

A need has thus arisen for a low cost limiting output power control circuit for a flyback converter.

SUMMARY OF THE INVENTION

In a flyback converter receiving a high voltage DC input for generating a low voltage output, a power control circuit is provided. The power control circuit includes a peak current mode controller having as an input, the flyback converter output. The controller generates a feedback signal to the flyback converter for controlling the switching frequency of switches present in the flyback converter. The peak current controller includes a clock circuit. Circuitry is provided for monitoring the high voltage DC input. The monitoring circuit generates a control signal which is applied to the clock controller circuit for controlling the switching frequency of the flyback converter to thereby control output power levels.

BRIEF DESCRIPTION OF THE DRAWINGS

For a more complete understanding of the present invention and for further advantages thereof, reference is now made to the following Description of the Preferred Embodiments taken in conjunction with the accompanying Drawing which is a block diagram of the present output power control circuit.

DESCRIPTION OF THE PREFERRED EMBODIMENTS

Referring to the Figure, the present output power control circuit, generally identified by the numeral 10 is illustrated for controlling the maximum power output of a flyback converter 12. Flyback converter 12 operates as a continuous conduction mode flyback converter having a low power conversion topology for converting high voltage input to a low voltage output. Flyback converter topology is described in U.S. Pat. Nos. 5,303,138 and 5,541,828, whose descriptions and drawings are hereby incorporated by reference.

Flyback converter 12 includes switches for controlling the operation of transformers, the switching frequency of such switches controls the voltage output of the converter. Flyback converter 12 receives a high voltage input via an input filter 14 which receives an ac input signal. Input filter 14 reduces the level of conducted or radiated, high frequency electromagnetic wave interference (EMI) and generates the rectified high voltage DC input to flyback converter 12. A capacitor 16 on the input to flyback converter 12 stabilizes the high voltage DC input voltage. The output of flyback converter 12 is applied to an output filter 18 whose output is applied to a load. Output filter 18 functions to filter the output of flyback converter 12 so that the load receives a DC voltage. The output of flyback converter 12 is also applied to a standby filter 20 whose filtered output is applied to a peak current mode control circuit 22. Circuit 22 functions to limit the peak current of the switches within flyback converter 12 by generating a feedback control signal on signal line 24 applied to flyback converter 12. The frequency of operation of the switches within flyback converter 12 is controlled by a clock circuit within peak current mode control circuit 22 including a transistor 26.

An important aspect of the present invention is the ability to control the operation of the clock circuit within peak current mode control circuit 22 by monitoring the output of input filter 14, representing the rectified line voltage, in order to linearly adjust the switching frequency of the switches within flyback converter 12. By lowering the switching frequency as the input voltage increases, the maximum output power versus input voltage response changes from a positive sloped line to a concave line. The maximum output power then occurs at the midrange of the input voltage and is significantly less than occurs at high line without the use of the present circuit.

The rectified high voltage DC is monitored by a resistor divider network including resistors 30 and 32 which are connected to the base of a transistor 34. Resistors 30 and 32 establish a voltage proportional to the rectified high voltage DC input to flyback converter 12. This voltage, proportional to the rectified high voltage DC is applied to transistor 34 which produces a voltage minus the junction voltage across transistor 34 which is divided by the value of a resistor 36 to generate a current in the emitter of transistor 34. The emitter current is mirrored in the collector such that any discharge current in capacitor 38 is proportional to the rectified high voltage DC. Capacitor 38 and a resistor 40 form an RC time constant for the clock of peak current mode control circuit 22. By controlling the rate of capacitor 38 charge, dependent on the high voltage DC signal, the clock frequency is changed to thereby change the switching frequency of the switches within flyback converter 12. Therefore, by monitoring the rectified high voltage DC signal input to the flyback converter 12, the clock frequency is adjusted. As line voltage increases, switching frequency is reduced to thereby limit output power.

The present invention also has the advantage that conducted emission switching frequency harmonics change from narrow band to broad band, and therefore lower levels, as the load increases.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a flyback converter, the converter receiving a rectified DC input voltage and which generates an output voltage, a limiting power control circuit comprising:

a peak current controller having an input from the flyback converter output and which generates a feedback signal to the flyback converter, said peak current controller including a clock circuit;

means for monitoring the rectified DC flyback converter input voltage and for generating a control signal; and said control signal being applied to said clock circuit for controlling the switching frequency of the flyback converter to thereby control output power levels.

2. The power control circuit of claim 1 wherein said monitoring means includes:

a transistor and a resistor divider network for generating a current proportional to the DC input voltage; and a resistor capacitor network connected to said clock circuit and said transistor, such that said capacitor is charged to a rate proportional to the rectified DC input voltage.

3. A method for controlling the output power of a flyback converter by controlling the switching frequency of the flyback converter comprising:

generating a feedback signal from a peak current controller having an input from the flyback converter output;

monitoring a rectified DC input voltage to the converter and generating a control signal; and applying the control signal to the peak current controller for controlling the switching frequency of the flyback converter.

* * * * *